(12) United States Patent
Hsiao

(10) Patent No.: US 6,174,058 B1
(45) Date of Patent: Jan. 16, 2001

(54) COUPLING SYSTEM FOR SECURING AN EYEGLASS FRAME TO A CAP VISOR

(76) Inventor: Yu-Teng Hsiao, No. 63, Kuo Yang 3rd Street, Chia Yi City (TW)

(*) Notice: Under 35 U.S.C. 154(b), the term of this patent shall be extended for 0 days.

(21) Appl. No.: 09/500,071

(22) Filed: Feb. 8, 2000

(51) Int. Cl.[7] ........................................ G02C 3/00
(52) U.S. Cl. ................................... 351/155; 2/10
(58) Field of Search .................... 351/155, 158, 351/140, 41; 2/10, 453; D16/300, 304, 309–317

(56) References Cited

U.S. PATENT DOCUMENTS

| | | | |
|---|---|---|---|
| 5,056,164 | * 10/1991 | Lisle et al. | 2/453 |
| 5,412,812 | * 5/1995 | Gatchalian | 351/155 |
| 5,533,207 | * 7/1996 | Diaz | 2/10 |
| 5,720,040 | * 2/1998 | Simone | 2/10 |
| 5,826,271 | * 11/1998 | Garrett | 2/10 |
| 5,987,640 | * 11/1999 | Ryder | 2/10 |

* cited by examiner

*Primary Examiner*—Hung Xuan Dang
(74) *Attorney, Agent, or Firm*—Rosenberg, Klein & Lee

(57) ABSTRACT

A coupling system in the present invention is provided for securing an eyeglass frame to a cap visor. The coupling system includes at least one coupling magnetic article inlaid in the cap visor and a protruding member provided with at least one coupling magnetic article therein and mounted on the top rim of the eyeglass frame so as for the eyeglass frame convenient to be securely coupled to the cap visor by the mutual magnetic attractive force of the at least one magnetic article inlaid in the cap visor and the at least one magnetic article in the protruding member.

1 Claim, 4 Drawing Sheets

COUPLING SYSTEM FOR SECURING AN EYEGLASS FRAME TO A CAP VISOR

BACKGROUND OF THE INVENTION

1. Field of the Invention

This invention relates to a coupling system for securing an eyeglass frame to a cap visor, and more particularly to a coupling system which includes at least one magnetic article inlaid in the cap visor and a protruding member provided with at least one magnetic article therein and mounted on the top rim of the eyeglass frame so as for the eyeglass frame convenient to be securely coupled to the cap visor by the mutual magnetic attractive force of the at least one magnetic article inlaid in the cap visor and the at least one magnetic article in the protruding member.

2. Description of the Related Art

Referring to FIG. 5, a conventional coupling system for securing an eyeglass frame 20 to a visor 101 of a cap 10 includes two pairs of protruding members 102 on the bottom surface of the cap visor 101, two protruding members 201 respectively provided on two top rim portion of the eyeglass frame 20 and two screws 30. In the center of each inner protruding member 102 is provided with a screwing hole 103, and in the center of each outer protruding member 102 is provided with a penetrating hole 104. In the center of each protruding member 201 on each top rim portion ofthe eyeglass frame 20 is provided with a penetrating hole 202. The eyeglass frame 20 can be securely coupled to the cap visor 101 after each screw 30 successively penetrating through each penetrating hole 104 of each outer protruding member 102, each penetrating hole 202 of each protruding member 201 on the eyeglass frame 20 and then being screwed in each screwing hole 103 of each inner protruding member 102.

However, there are following drawbacks in the above-mentioned conventional coupling system for securing an eyeglass frame to a cap visor:

1. It is not convenient to be assembled because each pair of protruding members of the cap visor and each protruding member of the eyeglass frame must correspond to each other before being penetrated by each screw.
2. Because the coupling system is assembled by means of screws and a screwing tool must be used, it causes much inconvenience and trouble for a user to assemble the coupling system.
3. The screws penetrating through the protruding members will easily release after the coupling system being frequently moved for a period of time.

SUMMARY OF THE INVENTION

Therefore, an objective of the present invention is to provide a coupling system which includes at least one magnetic article inlaid in a cap visor and a protruding member provided with at least one magnetic article therein and mounted on an eyeglass frame so as to obtain a strong magnetic attractive force to hold the eyeglass frame to the cap visor and can be taken apart by hand.

Another objective of the present invention is to provide a coupling system which can make an eyeglass frame be securely coupled to the bottom surface of a cap visor for use or coupled upside down to the top surface of a cap visor for storage and decoration.

Yet another objective of the present invention is to provide a coupling system whose at least one magnetic article is inlaid in a cap visor so that the magnetic force of both ends of the at least one magnetic article can reach both bottom and top surfaces of a cap visor and the appearance of a cap visor will not be influenced.

Accordingly, a coupling system in the present invention is provided for securing an eyeglass frame to a cap visor. The coupling system includes at least one coupling magnetic article inlaid in the cap visor and a protruding member provided with at least one coupling magnetic article therein and mounted on the top rim of the eyeglass frame so as for the eyeglass frame convenient to be securely coupled to the cap visor by the mutual magnetic attractive force of the at least one magnetic article inlaid in the cap visor and the at least one magnetic article in the protruding member.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
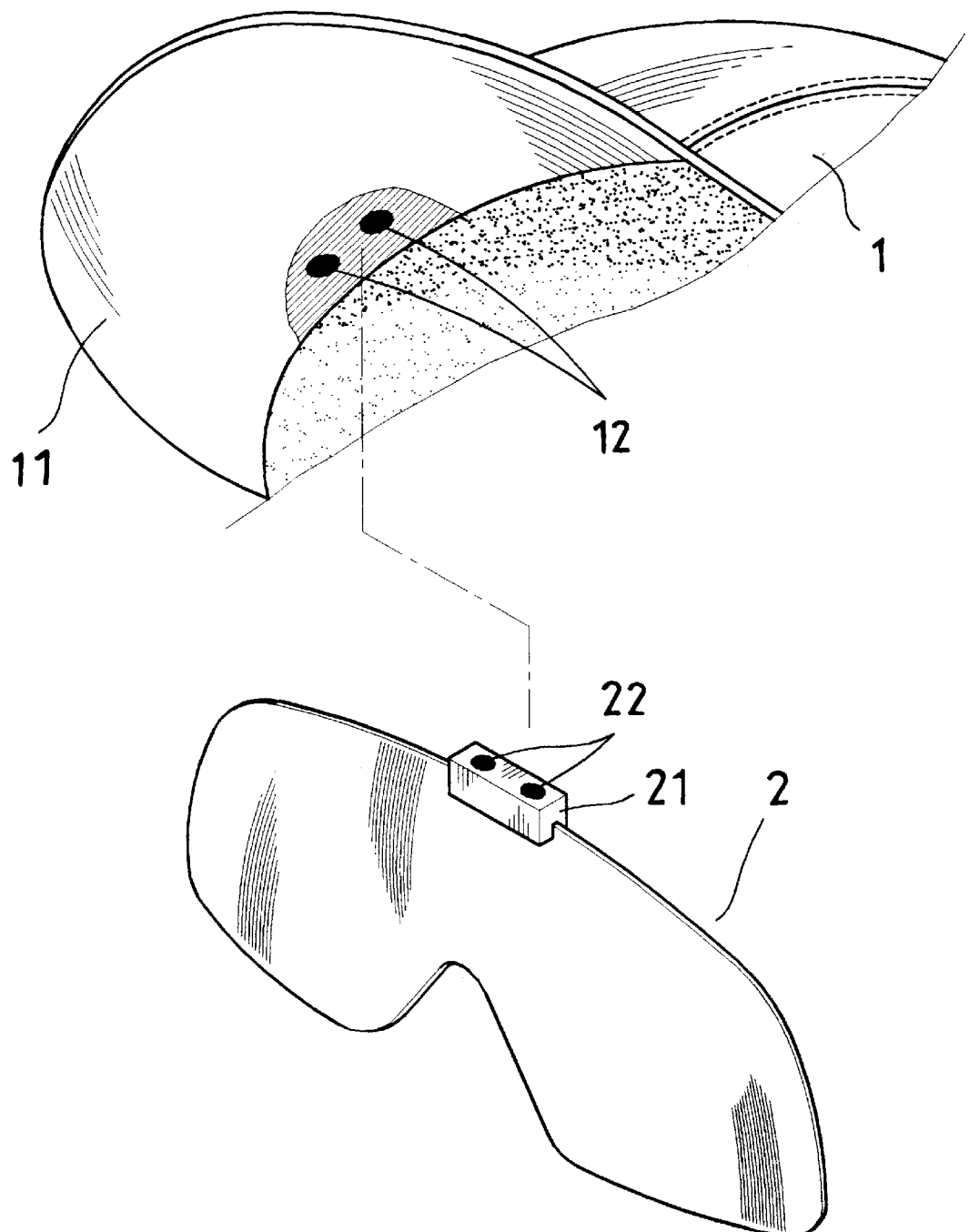
FIG. 1 is an exploded perspective view of a cap visor and an eyeglass frame with the coupling system in accordance with the present invention.
Figure 2:
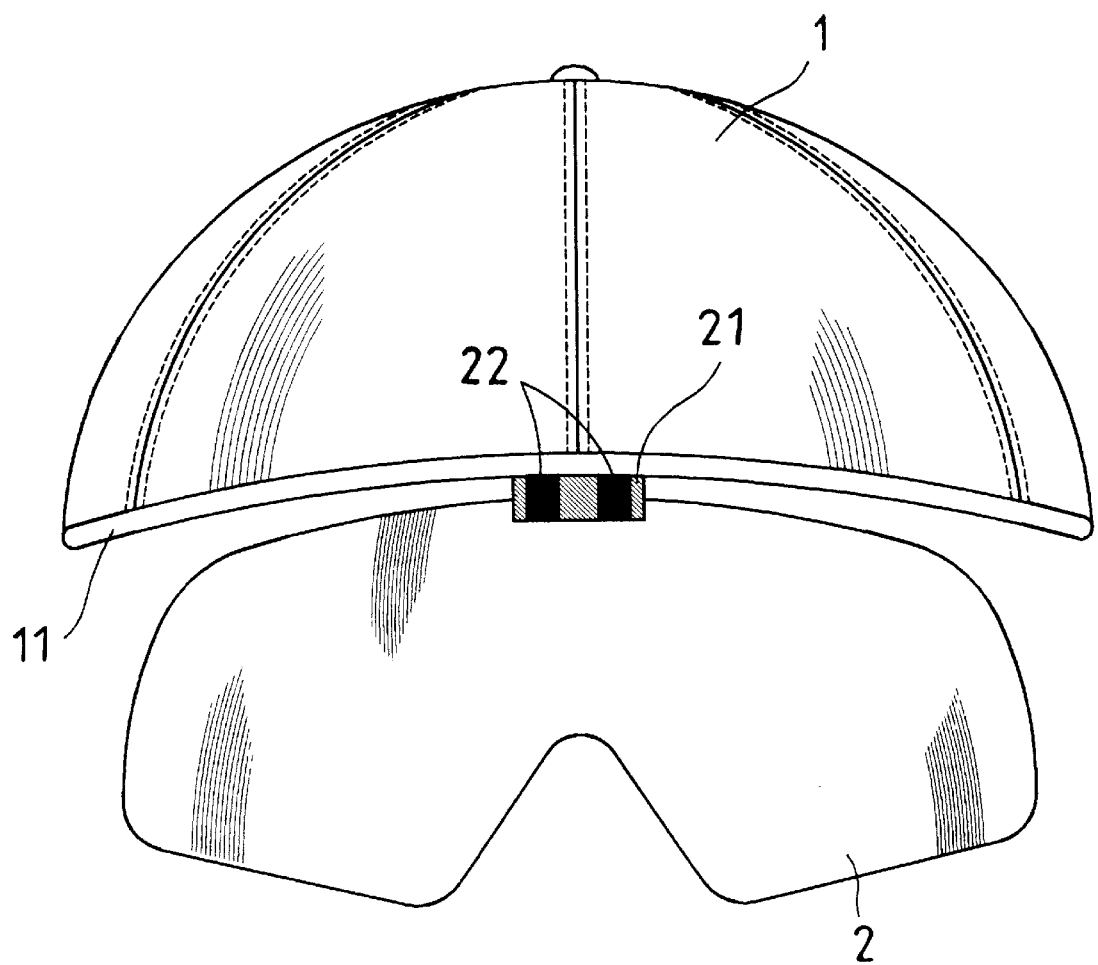
FIG. 2 is an elevation sectional view of a cap visor and an eyeglass frame in a coupled configuration in accordance with the present invention.
Figure 3:
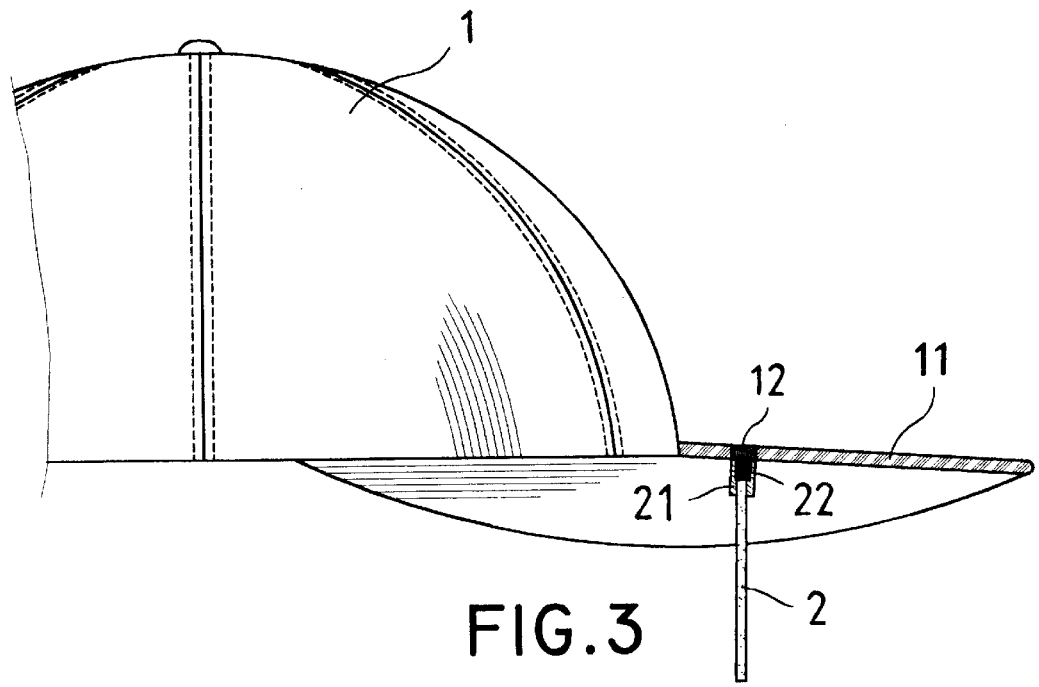
FIG. 3 is a side sectional view of a cap visor and an eyeglass frame in a coupled configuration in accordance with the present invention.

First, referring to FIG. 1, the present invention is provided with a coupling system for securing an eyeglass frame 2 to a visor 11 of a cap 1. The coupling system includes at least one coupling magnetic article 12 inlaid in the cap visor 11 and a protruding member 21 provided with at least one coupling magnetic article 22 therein and mounted on the top rim of the eyeglass frame 2 so as for the eyeglass frame 2 convenient to be securely coupled to the cap visor 11 by the mutual magnetic attractive force of the at least one magnetic article 12 inlaid in the cap visor 11 and the at least one magnetic article 22 in the protruding member 21, as shown in FIGS. 2 and 3.

Figure 4:
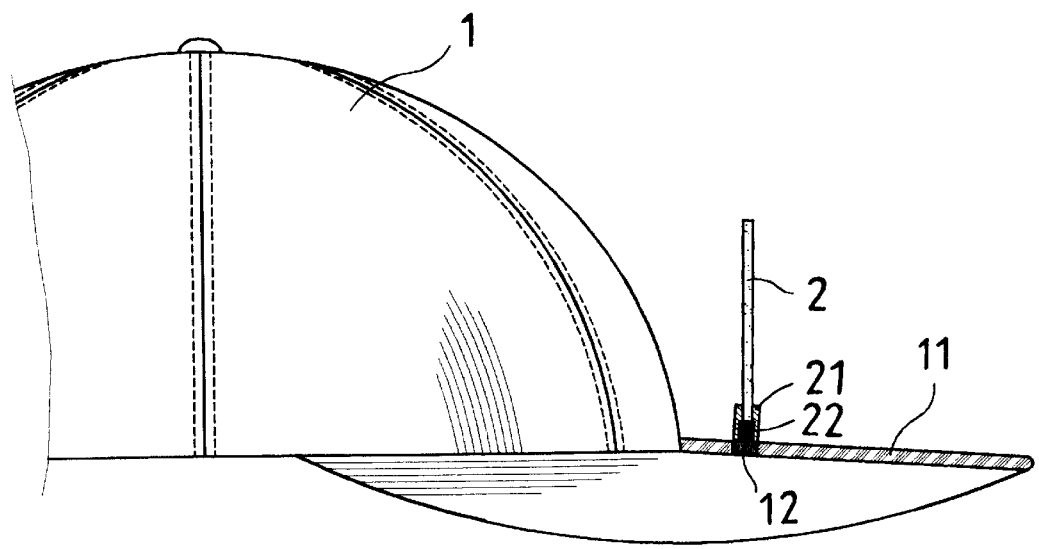
FIG. 4 is another side sectional view of a cap visor and an eyeglass frame in a coupled configuration in accordance with the present invention; and, FIG. 5 is an exploded perspective view of a cap visor and an eyeglass frame with a conventional coupling system.
Figure 5:
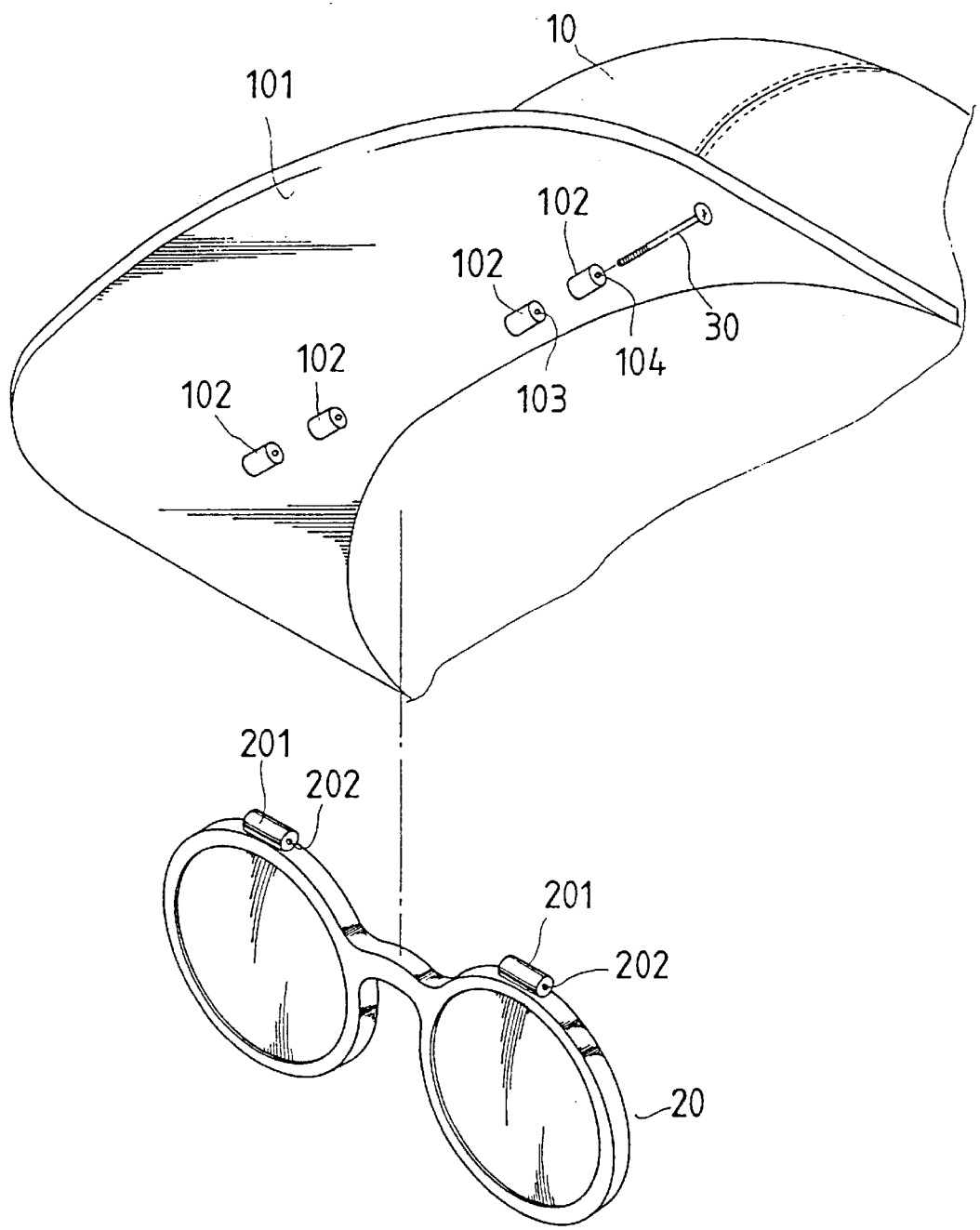

After the cap 1 being worn on a user's head, the eyeglass frame 2 can be securely coupled to the bottom surface of the cap visor 11 for use by the strong mutual magnetic attractive force of the at least one magnetic article 12 inlaid in the cap visor 11 and the at least one magnetic article 22 in the protruding member 21. Alternatively, the eyeglass frame 2 may be securely coupled upside down to the top surface of the cap visor 11, as shown in FIG. 4, both for storage and for decoration.

While the preferred embodiments of the invention have been described above, it will be recognized and understood that various modifications may be made therein and the appended claims are intended to cover all such modifications which may fall within the spirit and scope of the invention.

What is claimed is:

1. A coupling system for securing an eyeglass frame to a cap visor comprising at least one coupling magnetic article being inlaid in said cap visor; and a protruding member being provided on top rim of said eyeglass frame, at least one coupling magnetic article being provided in said protruding member so as for said eyeglass frame convenient to be securely coupled to said cap visor by the mutual magnetic attractive force of said at least one magnetic article inlaid in said cap visor and said at least one magnetic article in said protruding member;

whereby said eyeglass frame can be securely coupled to the bottom surface of said cap visor for use by the strong mutual magnetic attractive force of said at least one magnetic article inlaid in said cap visor and the at least one magnetic article in said protruding member, or said eyeglass frame may be securely coupled upside down to the top surface of said cap visor both for storage and for decoration.

* * * * *